(12) United States Patent
Jensen et al.

(10) Patent No.: US 8,695,458 B2
(45) Date of Patent: Apr. 15, 2014

(54) SLIDE HAMMER FOR A TIRE SPOON AND METHOD OF CONSTRUCTION OF THE SAME

(75) Inventors: Robert Jensen, Clarks Grove, MN (US); Robert Kochie, Dodge Center, MN (US); Michael White, Montgomery City, MO (US); Larry Betcher, Northfield, MA (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 66 days.

(21) Appl. No.: 13/400,450

(22) Filed: Feb. 20, 2012

(65) Prior Publication Data

US 2013/0213583 A1    Aug. 22, 2013

(51) Int. Cl.
*B25D 1/16* (2006.01)
*B60C 25/02* (2006.01)

(52) U.S. Cl.
USPC .................................. 81/27; 157/1.3; 173/91

(58) Field of Classification Search
USPC ........... 81/19, 20, 27, 25, 463; 7/143; 254/19, 254/25; 29/254; 173/90, 91, 126; 157/1.3, 5
See application file for complete search history.

(56) References Cited

U.S. PATENT DOCUMENTS

| | | | | |
|---|---|---|---|---|
| 117,609 A * | 8/1871 | Davids | | 81/19 |
| 127,363 A * | 5/1872 | Partridge | | 81/19 |
| 3,050,095 A * | 8/1962 | Prather | | 173/91 |
| 3,568,657 A * | 3/1971 | Gue | | 81/27 |
| 4,585,367 A * | 4/1986 | Gall | | 403/104 |
| 5,088,174 A | 2/1992 | Hull et al. | | |
| 5,254,063 A * | 10/1993 | House, Jr. | | 482/107 |
| 5,983,455 A | 11/1999 | Polzin et al. | | |
| 6,168,212 B1 | 1/2001 | Finley | | |
| 6,308,934 B1 * | 10/2001 | Gallo | | 254/25 |
| 7,191,685 B2 | 3/2007 | Lowther | | |
| 8,100,035 B1 | 1/2012 | Smith | | |

OTHER PUBLICATIONS

Written Opinion and International Search Report for PCT/US2013/026899; dated Apr. 18, 2013.

* cited by examiner

*Primary Examiner* — Hadi Shakeri
(74) *Attorney, Agent, or Firm* — Baker & Hostetler LLP

(57) ABSTRACT

A slide hammer may be provided. The slide hammer may include: a body defining a through hole and a first attaching surface; an auxiliary weight having a second attaching surface configured to attach to the body at the first attaching surface, the auxiliary weight having a through hole located to align with the through hole in the body when the auxiliary weight is attached to the body; and a shaft located in the through holes in the body and auxiliary weight. A method of constructing a slide hammer is provided.

18 Claims, 6 Drawing Sheets

SLIDE HAMMER FOR A TIRE SPOON AND METHOD OF CONSTRUCTION OF THE SAME

FIELD OF THE INVENTION

The present invention relates generally to a slide hammer used with a tire spoon. More particularly, the present invention relates to a slide hammer capable of being altered by the addition of additional weights where the slide hammer may also be used on a tire spoon.

BACKGROUND OF THE INVENTION

Slide hammers are tools that include a weight that is attached to a shaft and can be slid up and down the shaft. Usually at at least one location along the shaft, there is a stop that the slide hammer is rammed against to stop the slide hammer and thereby exert a force on the tool.

For various applications it may be desirable to use various levels or degrees of force with the slide hammer. Changing the level of force exerted by the slide hammer can be done by increasing or decreasing the velocity at which the slide hammer hits the stop. However, in some applications it may be desirable to equip a slide hammer to be able to impart a much larger force against the stop than can normally be done with conventional slide hammers. Slide hammers are sometimes limited in the force that can exert against a stop by several factors. These factors may include the length the shaft in which the slide hammer is able to slide and the weight of the slide hammer.

Furthermore, in some instances, it may be desirable to have a slide hammer that can exert force in two directions. This may be accomplished by a tool that has two stops so that the slide hammer can be slid in one direction and then encounter to stop. The slid hammer can also be slid in the other direction along the shaft where it encounters a second stop and thereby allowing the slide hammer to exert forces on tools at either end of the tool depending upon which stop the slide hammer rams into.

In situations where slide hammers are able to exert forces in multiple directions the tools often need to be manufactured with the slide hammer in place before the stops are located on the tools. Otherwise, if the stops are placed on the shaft before the slide hammer has been mounted and placed, there is no way the slide hammer may be mounted on the tool using conventional slide hammer technology.

Accordingly, it is desirable to provide a method and apparatus that may allow a slide hammer to be altered so that it can impart different levels of force and activate it. Further, it may also be desirable to provide a slide hammer that may be constructed in such a manner, that the slide hammer may be mounted on the shaft of the tool after stops or other tool features have been manufactured on tool.

SUMMARY OF THE INVENTION

The foregoing needs are met, to a great extent, by the present invention, wherein in one aspect an apparatus is provided that in some embodiments permits the slide hammer to be modified so that the slide hammer may impart various levels of force when activated.

In some embodiments of the invention, the slide hammer may be constructed in such a manner that the hammer portion may be mounted on the shaft after other shaft features such as a stop or other features have been manufactured into the tool containing the shaft.

In accordance with one embodiment of the present invention, a slide hammer may be provided. The slide hammer may include: a body defining a through hole and a first attaching surface; an auxiliary weight having a second attaching surface configured to attach to the body at the first attaching surface, the auxiliary weight having a through hole located to align with the through hole in the body when the auxiliary weight is attached to the body; and a shaft located in the through holes in the body and auxiliary weight.

In accordance with another embodiment of the present invention, a method of constructing a slide hammer is provided. The method may include: forming a body having a through hole and a first attaching surface; providing an auxiliary weight having a second attaching surface configured to attach to the body at the first attaching surface, the auxiliary weight having a through hole located to align with the through hole in the body when the auxiliary weight is attached to the body; and inserting a shaft in the through holes in the body and auxiliary weight.

In accordance with yet another embodiment of the present invention a slide hammer may be provided. The slide hammer may include: means for hammering defining a through hole and a first attaching surface; an auxiliary weight having a second attaching surface configured to attach to the means for hammering at the first attaching surface, the auxiliary weight having a through hole located to align with the through hole in the body when the auxiliary weight is attached to the means for hammering; and a shaft located in the through holes in the means for hammering and auxiliary weight.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
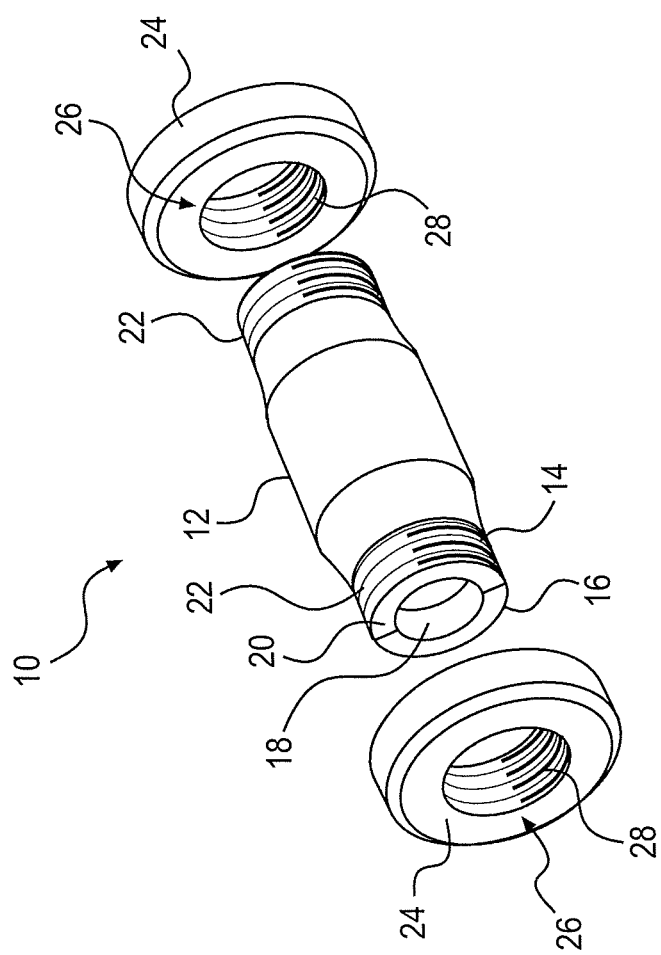
FIG. 1 is an exploded, perspective view of a side hammer in accordance with an embodiment of the invention.

The invention will now be described with reference to the drawing figures, in which like reference numerals refer to like parts throughout. An embodiment in accordance with the present invention provides a slide hammer that is fit upon a tire spoon. An embodiment in accordance with the invention is shown as an exploded, perspective view in FIG. 1.

FIG. 1 shows a slide hammer assembly 10. The slide hammer assembly 10 includes a hammer body 12. The hammer body 12 may be comprised of two halves 14 and 16 that fit together in a clam shell type manner. The hammer body 12 may be made of steel or other suitable substance for use as a slide hammer. The two halves 14 and 16 define a through hole 18 that extends through the hammer body 12.

As shown in FIG. 1, some embodiments may include a chamfered edge 20 located at the through hole 18. The chamfered edge 20 may be present at both ends of the body 12. The hammer body 12 may be equipped with exterior threads 22. Exterior threads 22 are configured to secure additional or auxiliary weights 24 to the hammer body 12. The exterior threads 22 are located on both halves 14 and 16. The additional weight 24 has a through hole 26 that aligns with the through hole 18 and the hammer body 12 when the additional weight 24 is attached with its interior threads 28 to the exterior threads 22 of the hammer body 12.

In some embodiments of the invention, the internal weights 24 may provide several functions. For example, the additional weights 24 may be used to keep the two halves 14 and 16 of the clam shell body 12 together. When the extra weights 24 are secured to the hammer body 12, the halves 14 and 16 are connected and unable to separate. The auxiliary weights 24 also provide the advantage of adding additional weight to the body 12 of the slide hammer. Adding or not adding the additional weight allows a user to modify and select a weight of the slide hammer.

In some embodiments of the invention, at least one additional weight 24 is needed to secure the two halves 14 and 16 over hammer body together at 12. However, additional weights 24 can be added to make the mass of hammer body 12 greater in order to increase the force that the slide hammer 12 can impart on to a stop 34 (see FIG. 2) when the slide hammer 12 is activated. Not all embodiments in accordance of the invention require that the hammer body 12 be in two halves 14 and 16. In some embodiments, the hammer body 12 may be a solid piece with a through hole 18. In such embodiments, the exterior weights 24 primarily provide the function of adding weight to hammer body 12.

In some embodiments of the invention, various different weights 24 can be used in order to bring the hammer body 12 to a desired weight in order to impart a desired force when side hammer 12 is activated. In some embodiments of the invention, the exterior weights 24 can be steel or may be made of other substances. Not all embodiments require that the exterior weights 24 be of the same material as the hammer body 12.

Figure 2:
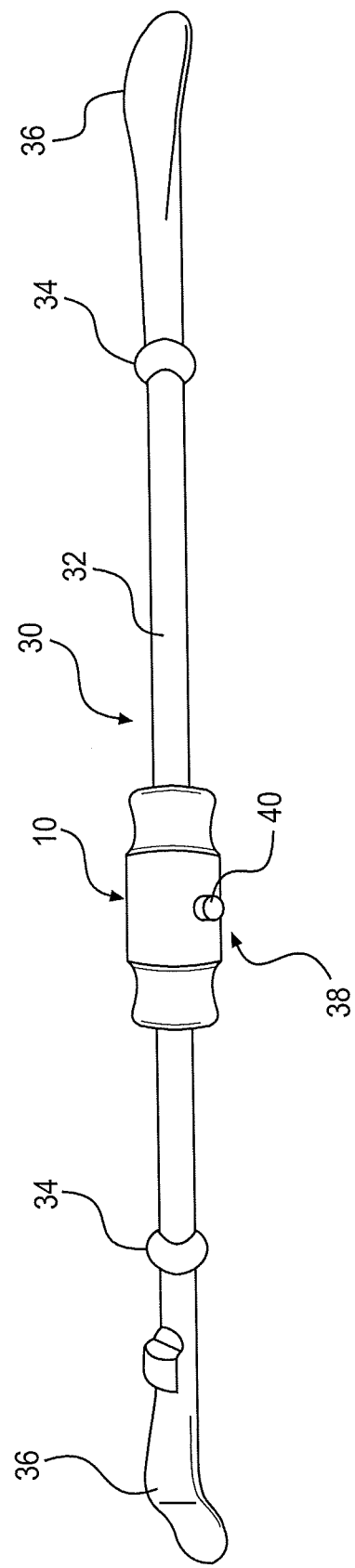
FIG. 2 is a perspective view of a tire spoon having a slide hammer mounted on it in accordance with an embodiment of the invention.

Turning to FIG. 2, a slide hammer assembly 10 is shown mounted onto a tire spoon 30. The tire spoon 30 includes a shaft 32 upon which the slide hammer assembly 10 may slide between stops 34. The stops 34 are robust and connected to the tire spoon 30 so that the slide hammer assembly 10 can strike the stops 34 without dislodging stops 34 thereby causing force of the blow of the hammer assembly 10 to be transferred to the tire spoon 30. In embodiments of the invention where the hammer body 12 is made up of two halves 14 and 16 as shown in FIG. 1, advantages may be achieved in that the slide hammer assembly 10 can be mounted to the shaft 32 after the tool of which the shaft 32 is a part of may be manufactured. For example, in the case of tire spoon 30 as shown in FIG. 2, the tire spoon 30 may have the spoons 36 and the stops 34 manufactured on the tire spoon 30 without having the slide hammer assembly 10 being required to be placed on the shaft before the spoons 36 and stops 34 are formed. The two halves 14 and 16 may be mounted to the shaft 32 after the stops 34 and spoons 36 are formed.

In some embodiments of the invention (with reference to FIGS. 1 and 2), the through holes 26 on the additional weights 24 may be sized large enough to fit over the features the tool such as the tire spoon 36 and/or stops 34. Therefore the tire spoon 30 may be manufactured with the stop 34 and the tire spoon 36 without the additional weights 24 located on the shaft 32. The additional weights 24 may be mounted to hammer body 12 later. The through hole 26 of the additional weight 24 is sized and dimensioned so the additional weight 24 will fit over the tire spoon 36, the stop 34 and be secured to the hammer body 12 via the exterior threads 22 interacting with the interior threads 28. If it is a desired to use additional weights 24 of additional size or weight, they may be added or removed as required and fit over the stop 34 and tire spoon 36. As such, additional weights 24 may be available as an after market items and may or may not be manufactured or sold with the tire spoon 30.

In some embodiments of the invention, the slide hammer assembly 10 may include a lock mechanism 38. The lock mechanism 38 may be activated in several different ways, for example, as shown in FIG. 2, the lock mechanism 38 may include a detent button 40.

Figure 3:
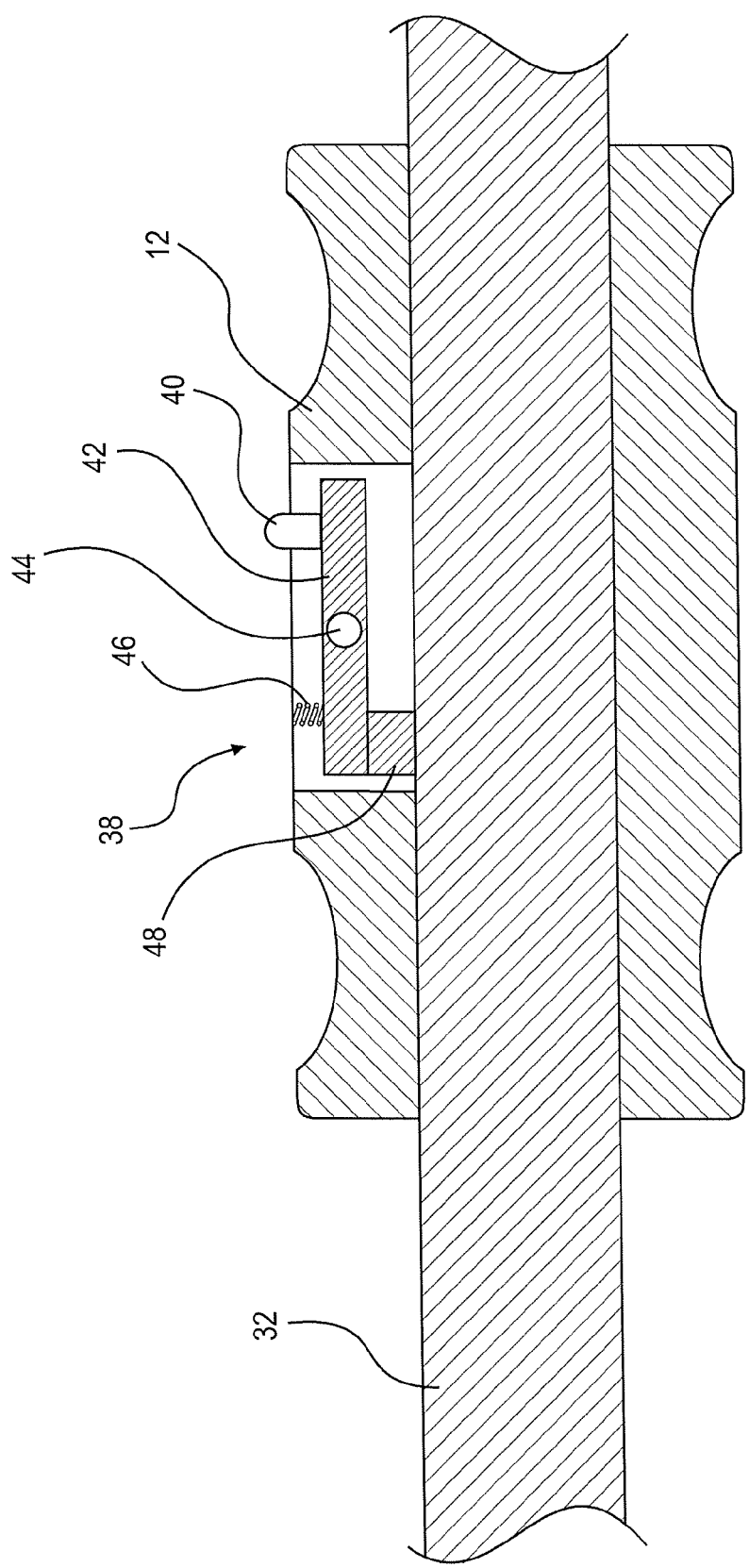
FIG. 3 is a partial cross-sectional view of the slide hammer in accordance with an embodiment of the invention.

FIG. 3 is a partial cross-sectional of a slide hammer assembly 10 where the lock mechanism 38 includes a detent button 40. The detent button 40 is mounted to a rocking lever 42 which pivots over a pivot point 44. The rocking lever 42 is biased by a spring 46 which biases a engaging member 48 against the shaft 32. The force of the spring 46 is selected such that the engaging member 48 generates sufficient friction against the shaft 32 that the slide hammer assembly 10 does not move with respect to the shaft 32 unless the detent 40 is depressed. In other embodiments, the engaging member 48 may more positively lock with the shaft 32 for example, by fitting into a detent in the shaft 32.

Depressing the detent button 40 pivots the locking lever 42, compresses the spring 46 and causes the engaging member 48 to disengage from the shaft 32, thereby allowing a user to operate the slide hammer assembly 10. When it is no longer desired to operate the slide hammer assembly 10, the user releases the detent button 40, thereby locking the slide hammer assembly 10 in place on the shaft 32. Such a feature may be useful when it is not desired for the slide hammer assembly 10 to move about the shaft 34 when the tool such as a tire spoon 30 is being manipulated and the use of the slide hammer assembly 10 is not desired.

Figure 4:
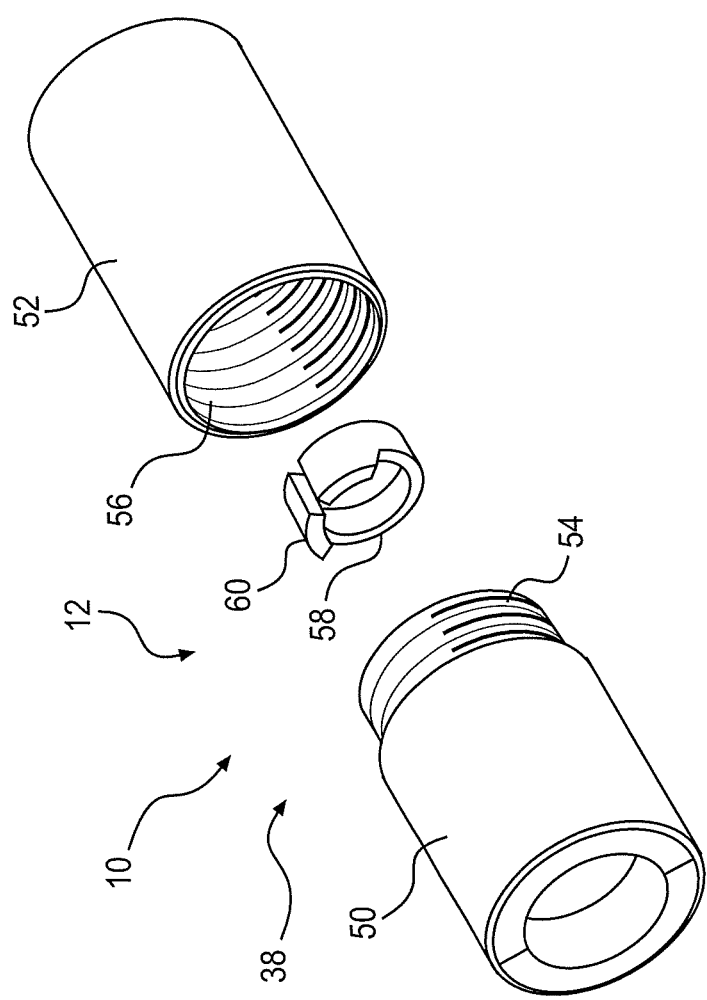
FIG. 4 is an exploded, respective view of the slide hammer in accordance with an embodiment of the invention.
Figure 5:
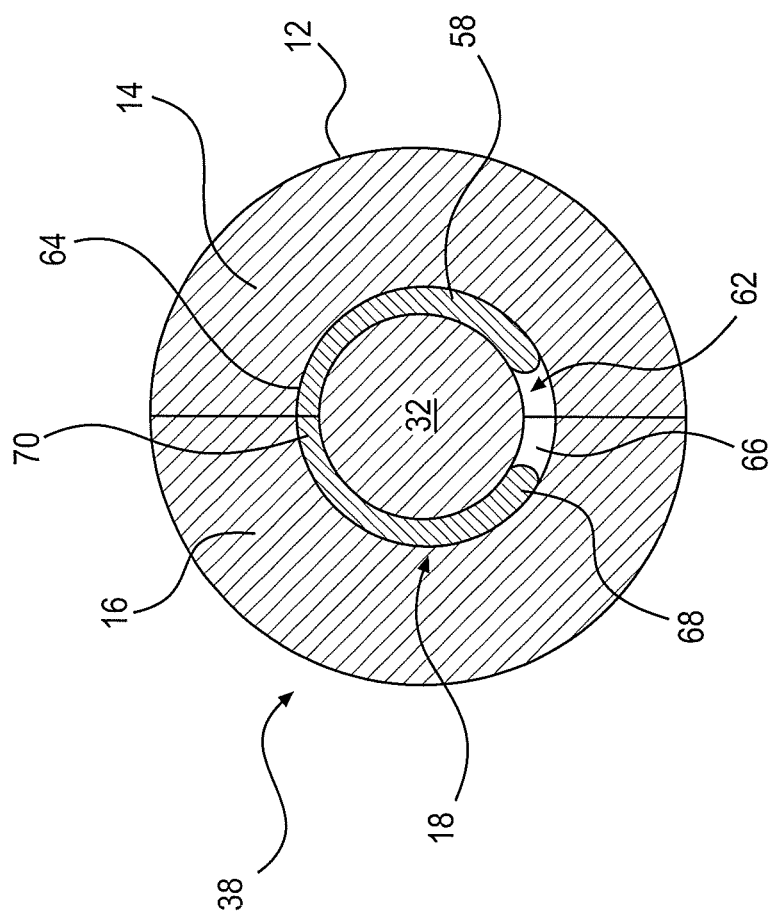
FIG. 5 is a cross-sectional view of a slide hammer in accordance with an embodiment of the invention.
Figure 6:
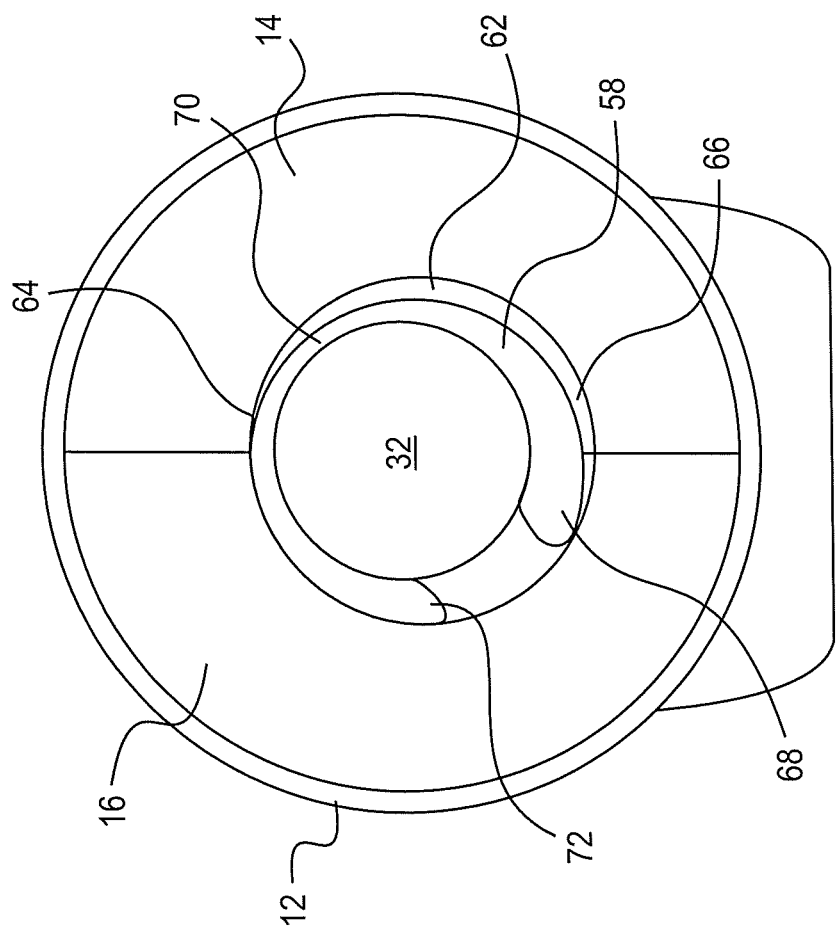
FIG. 6 is a cross-sectional view of a slide hammer in accordance with an embodiment of the invention.

Another locking mechanism 38 is illustrated in FIGS. 4-6. In FIGS. 4-6 a slide hammer assembly 10 is shown with a locking mechanism 38 that is activated by twisting the hammer body 12. In the embodiment shown in FIG. 4, the hammer body 12 is made up a fore 50 and aft 52 half. The fore 50 and aft half 52 may attach to each other by exterior threads 54 mating with interior threads 56 as shown. Other attaching methods may also be used in accordance with the invention. Attaching the fore 50 and aft 52 halves together traps a lock collet 58 between them. The lock collet 58 is generally C-shaped. The lock collet 58 is a unclosed ring as shown in FIG. 4 and may include locking member 60 which have a greater thickness in axial length than the remainder of the lock collet 58 as shown.

FIG. 5 is a cross-sectional view of a hammer body 12 including the locking mechanism 38 and a lock collet 58. The lock collet 58 is located in an off center trench 62. The off center trench 62 may be circular as shown but is located off center from the through hole 18 in a hammer body 12. Locating the trench 62 off center results in the trench forming a shallow side 64 and a deeper side 66 with respect to the through hole 18.

In FIG. 5, the shaft 32 is shown extending through the lock collet 58. The thick part 68 of the lock collet 58 (also referred to as the locking member 60) is located in the deep part 66 of the off center trench 62. The thin part 70 of the lock collet 58 is located in the shallow side 64 of the off center trench 62. This results in minimal friction or interference between the lock collet 58 and the shaft 32. When it is desired to lock the hammer body 12 onto the shaft 32, the user rotates the hammer body 12 to a locking position as shown in FIG. 6.

In FIG. 6, the hammer body 12 has been rotated on the shaft 32. This rotation has caused the thick part of 68 (one side of the thick part 68 is now compressed and identified in FIG. 6 as reference character 72) of the lock collet 58 to move to a more narrow or shallow side 64 of the trench 62. Moving the lock collet 58 in this manner has caused the lock collet 58 to compress between the shaft 32 and hammer body 12. In some embodiments the lock collet 58 may be made of nylon or any other suitable substance.

The amount of compression that the thick part 72 of the lock collet 58 or the locking member 60 is the reduction of the diameter of the off center trench 62. As shown in FIG. 6, part of the lock collet 58 is a compressed portion 72. The difference between the compressed portion 72 and the thick part 68 illustrates the reduction in a diameter of the off center trench 62 with respect to the shaft 32. The compression of the lock collet 58 results in friction and/or interference between the lock collet 58 and the shaft 32 thereby locking the hammer body 12 onto the shaft 32. When it is desired to unlock the hammer body 12 with respect to the shaft 32, the user may twist the hammer body 12 back to the position shown in FIG. 5 which allows the locking member 60 or thick part 68 of the lock collet 70 to reside in the deep part 66 of the off center trench 62 and the thin part 70 of the lock collet 58 to reside in the shallow side 64 of the off center trench 62 as shown in FIG. 5.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A slide hammer comprising:
   a body defining a through hole and a first attaching surface;
   a first auxiliary weight having a second attaching surface configured to attach to the body at the first attaching surface, the first auxiliary weight having a through hole located to align with the through hole in the body when the first auxiliary weight is attached to the body;
   a shaft located in the through holes in the body and first auxiliary weight; and
   tire spoons located on either end of the shaft, wherein the through hole on the first auxiliary weight is dimensioned to allow the first auxiliary weight to fit over the tire spoons.

2. The slide hammer of claim 1, further comprising;
   a second auxiliary weight having a third attaching surface configured to attach to the body at a fourth attaching surface on the body, the second auxiliary weight having a through hole located to align with the through hole in the body when the second auxiliary weight is attached to the body.

3. The slide hammer of claim 1, wherein the attaching surfaces are threads.

4. The slide hammer of claim 1, wherein the body is comprised of two subparts configured to fit together in a clamshell configuration around the shaft.

5. The slide hammer of claim 4, wherein when the first auxiliary weight is attached to the body, the two subparts of the body are fastened together by the first auxiliary weight.

6. The slide hammer of claim 1, further comprising a locking mechanism located in the body and configured to selectively lock the body in a linear position along the shaft.

7. The slide hammer of claim 6, wherein the locking mechanism includes a spring loaded push button mechanism.

8. The slide hammer of claim 7, wherein the push button mechanism includes a brake configured to be biased by a spring to urge against the shaft.

9. The slide hammer of claim 6, wherein the locking mechanism includes a lock collet that moves between a locking position and an unlocking position when the slide hammer is twisted with respect to the shaft.

10. The slide hammer of claim 9, wherein the lock collet is made of nylon.

11. The slide hammer of claim 9, wherein the lock collet has a varying radial thickness.

12. The slide hammer of claim 11, further comprising a circular groove in the body located off center with respect to the through hole in the body and the lock collet is located in the groove.

13. The slide hammer of claim 12, wherein the lock collet is generally C-shaped.

14. The slide hammer of claim 13, wherein the body has a fore and aft section and the lock collet is located between the fore and aft sections.

15. The slide hammer of claim 14, further comprising threads located on the fore and aft parts of the body and configured to communicate to attach the fore and aft parts of the body together.

16. The slide hammer of claim 1, wherein at least one of the tire spoons is removably attached to the shaft.

17. A method of constructing a slide hammer comprising:
   forming a body having a through hole and a first attaching surface;
   providing an auxiliary weight having a second attaching surface configured to attach to the body at the first attaching surface, the auxiliary weight having a through hole located to align with the through hole in the body when the auxiliary weight is attached to the body;
   inserting a shaft in the through holes in the body and auxiliary weight; and
   attaching tire spoons to ends of the shaft, wherein the through hole on the auxiliary weight is dimensioned to allow the auxiliary weight to fit over the tire spoons.

18. A slide hammer comprising:

means for hammering defining a through hole and a first attaching surface;

an auxiliary weight having a second attaching surface configured to attach to the means for hammering at the first attaching surface, the auxiliary weight having a through hole located to align with the through hole in the body when the auxiliary weight is attached to the means for hammering;

a shaft located in the through holes in the means for hammering and auxiliary weight; and tire spoons located on either end of the shaft, wherein the through hole on the auxiliary weight is dimensioned to allow the auxiliary weight to fit over the tire spoons.

* * * * *